United States Patent [19]

Sakota et al.

[11] Patent Number: 4,914,163

[45] Date of Patent: Apr. 3, 1990

[54] PROCESS FOR PREPARING HETEROCYCLIC COPOLYMERS

[75] Inventors: Kazuyuki Sakota; Wataru Minoshima; Takayuki Masuda, all of Saitama; Chihiro Imai, Kanagawa; Tetsuro Nakahama, Hiroshima; Toshimitsu Sugawara, Hiroshima; Yoshio Nakagawa, Hiroshima, all of Japan

[73] Assignees: Tonen Sekiyu Kagaku Kabushiki Kaisha; Nitto Chemical Industry Co., Ltd., both of Tokyo, Japan

[21] Appl. No.: 290,188

[22] Filed: Dec. 27, 1988

[30] Foreign Application Priority Data

Dec. 28, 1987 [JP] Japan .................................. 62-333889
Dec. 5, 1988 [JP] Japan .................................. 63-307138

[51] Int. Cl.$^4$ ............................................ C08G 18/82

[52] U.S. Cl. ...................................... 525/452; 528/52; 528/67

[58] Field of Search ...................... 525/452; 528/67, 52

[56] References Cited

U.S. PATENT DOCUMENTS 3,661,859  5/1972  Patton ................................... 528/67

Primary Examiner—Maurice J. Welsh
Attorney, Agent, or Firm—Wenderoth, Lind & Ponack

[57] ABSTRACT

According to the present invention, heterocyclic copolymers comprising recurring units [A] and [B] having specific structures are obtained by hydrolyzing reaction products of diisocyanate compounds having specific structures with tolidine diisocyanate and hydrogen cyanide.

The heterocyclic copolymers thus obtained are excellent in mechanical strength, heat resistance and solvent resistance.

16 Claims, No Drawings

PROCESS FOR PREPARING HETEROCYCLIC COPOLYMERS

FIELD OF THE INVENTION

The invention relates to a process for preparing heterocyclic copolymers and more particularly to a process for preparing heterocyclic copolymers excellent in characteristics such as mechanical strength, heat resistance and solvent resistance.

BACKGROUND OF THE INVENTION

Polymers (polyparabanic acid) (hereinafter sometimes described as "PPA") having an imidazolidinetrione ring (parabane ring), which are obtained by hydrolysis of polymers obtained by reaction of hydrogen cyanide with one or two or more diisocyanates, are already known, and this PPA has attracted special interest as heat resistant polymer lately.

Specifically speaking, PPA may be prepared, for example, by the process disclosed in Japanese Patent Publn. No. 20960/1974 or the like.

Since the polymer obtained by the process disclosed in the patent publication cited above and having structural units represented by the following formula (a) has a parabane ring in its main skeleton, said polymer is basically excellent in various characteristics such as mechanical strength, heat resistance and solvent resistance.

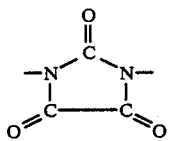
(a)

However, on investigation on this polymer, the present inventor has found that said polymer having structural units represented by the above-mentioned formula (a) markedly varies in its characteristics according to the kind of the substituent attaching to the nitrogen atom in said structural unit. That is, the characteristics of the polymer such as mechanical strength, heat resistance and solvent resistance markedly vary according to the kind of substituent R in the recurring unit represented by the following formula (b).

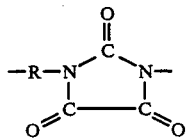
(b)

Particularly, on closer investigation on characteristics of the polymers disclosed concretely in the above-cited patent publication, it has been found that said polymers are relatively low in mechanical strength.

As a result of investigation on the relationship between the kind of the above-mentioned substituent R and the characteristics of the polymer having said substituent R, the present inventor has found that when the substituent R of the polymer having the above-mentioned recurring unit (b) is a specific aromatic group, the resulting polymer is able to have characteristics such as mechanical strength superior to those of the polymer concretely disclosed in the above-cited patent publication, and has obtained such technical information that this improvement is the above-mentioned characteristics can be made without a large sacrifice of other characteristics. Furthermore, the present inventor has obtained such a technical information that the characteristics of the polymer having the specific aromatic group mentioned above may be improved particularly when said polymer is formed into a copolymer containing a recurring unit having other specific substituent in addition to the recurring unit having the above-mentioned specific aromatic group. Thus, the present inventor has attained the present invention.

OBJECT OF THE INVENTION

The present invention is intended to solve such problems associated with the prior art, and it is an object of the invention to provide a process for preparing heterocyclic copolymers excellent in characteristics such as mechanical strength, heat resistance and solvent resistance.

SUMMARY OF THE INVENTION

The present invention is directed to a process for preparing heterocyclic copolymers having recurring units represented by the following formulas [A] and [B] by hydrolysis of reaction product of a diisocyanate compound represented by the formula [a]

$$OCN-R-NCO \qquad [a]$$

(wherein R represents a divalent aromatic group selected from the class consisting of

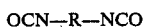

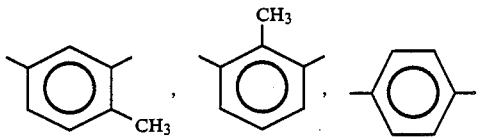

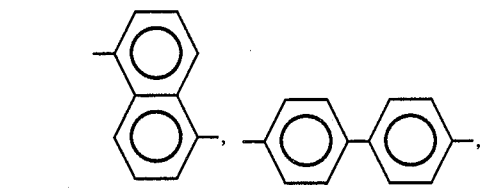

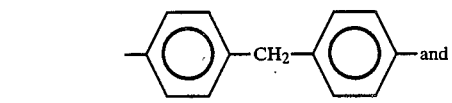

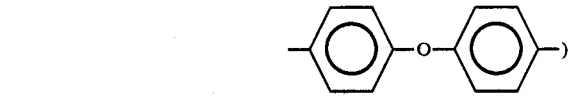

with tolidine diisocyanate and hydrogen cyanide.

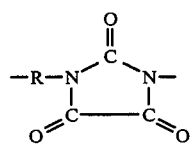
[A]

wherein R is as defined above.

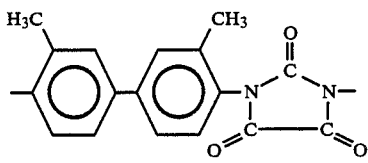

According to the process of the present invention, heterocyclic copolymers having specific recurring units represented by the above-mentioned formulas [A] and [B] are obtained. The heterocyclic copolymers of the present invention thus prepared have not only excellent mechanical strength but also improved heat resistance and solvent resistance.

EDTAILED DESCRIPTION OF THE INVENTION

The process for preparing heterocyclic copolymers of the present invention is illustrated below in detail.

Starting Materials

In the present invention, a diisocycanate compound represented by the following formula [a] (hereinafter called diisocyanate compound (I)), tolidine diisocyanate and hydrogen cyanide are used as starting materials.

OCN—R—NCO  [a]

The diisocyanate compound (I) represented by the above-mentioned formula [a] includes concretely such compounds of the formula [a] as 2,4-tolylene diisocyanate in which R is

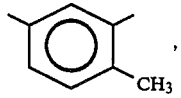

2,6-tolylene diisocyanate in which R is

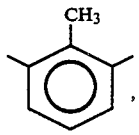

paraphenylene diisocyanate in which R is

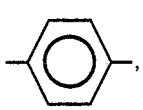

4,4'-biphenyldiisocyanate in which R is

1-5-naphthalene diisocyanate in which R is

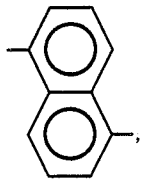

4,4'-diphenylmethane diisocyanate in which R is

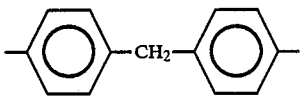

and 4,4'-diphenyl ether diisocyanate in which R is

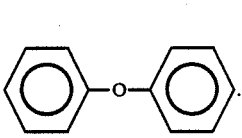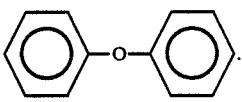

These diisocyanate compound (I) are usually used singly, however, they are also usable in the form of a combination of two or more.

In the present invention, a diisocyanate compound (I) having any one of the above-mentioned groups represented by R and tolidine diisocyanate (TODI) are used as the diisocyanate compounds, and these diisocyanate compounds are reacted with hydrogen cyanide, thereby obtaining eventually a heterocyclic copolymer having recurring units represented by the formulas [A] and [B].

The diisocyanate compounds used in the process of the present invention are the above-mentioned diisocyanate compound (I) and TODI, however, other diisocyanate compounds may also be used in combination therewith in such a range that they do not mar the characteristics of the heterocyclic copolymer obtained thereby.

Concrete examples of other diisocyanate compounds which are usable in the present invention include diisocyanate compounds having as a main chain an alkylene group, allylene group, cycloalkylene group and a group derived from such group mentioned above, such as m-phenylene diisocyanate, p-xylylene diisocyanate, m-exylylene diisocyanate, 3,3'-dimethoxy-4,4'-biphenylene diisocyanate, 4,4'-diphenylisopropylidene diioscyanate, 4-(4-isocyanatecyclohexyl)phenyl isocyanate, 4-isocyanatebenzyl isocyanate, 4,4'-diphenyl sulfone diisocyanate, tetrafluoro-p-phenylene diisocyanate, tetrafluoro-m-phenylene diisocyanate, 4,4'-diisocyanateoctafluorobiphenyl and durene diisocyanate: 3,3'-dimethyl-4,4'-methylenebis(cyclohexylisocyanate), 1,4-diisocyanate cyclohexane and isophorone diisocyanate: hexamethylene diisocyanate, dodecamethylene diisocyanate and 2,2,4-trimethylhexamethylene diisocyanate, and diisocyanate compounds having an aliphatic hydrocarbon group in the main chain such as di(3-isocyanatepropyl)ether in which the alkyl groups are linked with a divalent group or atom.

Further, with the view of controlling the degree of polymerization, there may be used small amounts of a monoisocyanate compound such as phenylisocyanate in the starting materials mentioned above.

Because of their having an aromatic group derived from TODI, an aromatic group derived from the diisocyanate compound (I) and a parabane ring, the heterocyclic copolymers obtained according to the process of the present invention from the above-mentioned starting materials are markedly improved in various characteristics such as mechanical strength in comparison with the known polyparabanic acid homopolymer and polyparabanic acid copolymers.

Reaction of diisocyanate compound (I) with TODI and hydrogen cyanide

In practicing the reaction of the above-mentioned diisocyanate compound (I) with TODI and hydrogen cyanide, the amounts of the diisocyanate compound (I) and TODI used are so defined that the molar proportion of the diisocyanate compound (I) to TODI becomes usually 1:9– 9:1, preferably 2:8–8:2, and more preferably 3:7–7:3. In this reaction, when the above mentioned molar proportion as defined above deviates from its range, the resulting heterocyclic copolymers sometimes do not sufficiently improve in various characteristics such as mechanical strength, heat resistance and solvent resistance.

Further, when taking workability into account, the heterocyclic copolymers obtained by the process of the present invention are desirably not so high in the degree of polymerization, and the reaction is carried out usually in the presence of polymerization regulators. Besides the above-mentioned monoisocyanate compounds, carboxylic acid anhydrides can also be used as the polmerization regultors. For instance, the monoisocyanate compound may be used as the polymerization regulator in an amount of 0.001–0.2 mole per 1 mole of the sum of the diisocyanate compound (I) and TODI.

In this reaction, hydrogen cyanide is used in an amount of 1~1.1 moles per 1 mole of the sum of the diisocyanate compound (I) and TODI and, a polymerization regulator, if any.

Reaction Conditions

This reaction is carried out usually in the presence of solvents. The reaction solvents used desirably in that case include concretely polar solvents such as dimethylformamide (DMF), dimethylacetamide (DMAC), dimethyl sulfoxide (DMSO), N-methylpyrrolidone (NMP), etc.

This reaction can be carried out in the presence of catalysts. Concretely preferred catalysts in that reaction include those comprising alkali metal cyanides such as sodium cyanide and potassium cyanide.

Such reaction as mentioned above is carried out usually at a temperature of 0°–140° C.

By carrying out the reaction in the manner now described, poly(iminoimidazolidine-dione) is formed.

Hydrolysis Reaction

By hydrolysis of the poly(iminoimidazolidinedione) formed by the above-mentioned reaction, a heterocyclic copolymer having an imidazolidine-trione ring, that is, a polyparabanic acid copolymer, can be obtained.

This hydrolysis reaction may be carried out by bringing the above-mentioned poly(iminoimidazolidine-ione) in contact with hydrolyzing agents comprising aqueous solution of Brensted acid such as hydrogen chloride, hydrogen bromide, sulfuric acid and formic acid, or bringing said poly(iminoimidzaolidine-dione) in contact with hydrolizing agents such as anhydrous hydrogen chloride gas and hydrogen fluoride gas in the presence of water, followed by heating.

The above-mentioned hydrolyzing agents may also be incorporated previously into the above-mentioned polar solvents used in the synthesis of the poly(iminoimidazolidine-dione).

This hydrolysis reaction is carried out usually by heating the reaction system at a temperature of 10°–150° C., preferably 40°–120° C. for a period of from 5 minutes to 5 hours.

After the hydrolysis treatment of the poly(iminoimidazolidine-dione) is over, the treated product obtained is mixed with water, whereby a precipitate of PPA is formed, and the precipitate is separated by a suitable procedure such as filtration or centrifugal separation.

Before the hydrolysis treatment product is mixed with water, there can be adopted previously a suitable procedure which comprises neutralizing the acid remaining in said hydrolysis treatment product with alkali agents such as ammonia and sodium hydroxide, and separating the resulting salt by suitable means such as filtration or centrigural separation.

The hetrocyclic copolymer thus obtained have the aformentioned recurring units [A] and [B], said recurring unit [A] and recurring unit [B] are usually linked with each other at random, and the molar ratio of [A] to [B] being usually 1/9–9/1, preferably 2/8–8/2, and more preferably 3/7–7/3.

An intrinsic viscosity (as measured in dimethylformamide at 30° C.) of the heterocyclic copolymers obtained by the present invention is usually 0.1–2.0 dl/g. By having an intrinsic viscosity which falls within the above-mentioned range, the hetrocyclic copolymers of the present invention tend to improve in various properties such as mechanical strength, heat resistance and solvent resistance and, at the same time, to have good workability.

The heterocyclic copolymers prepared by the process according to the invention are useful in the production of heat resistant shaped articles, in particular heat resistant films and sheets, which find applications in the fields of FPC copper-clad sheets, insulators for wires, plane heating elements and vibrators of speakers. The copolymers are also useful in the form of varnishes as heat resistant paints and for coating wires.

EFFECT OF THE INVENTION

According to the process of the present invention, heterocyclic copolymers having specific recurring units represented by the aforementioned formulas [A] and [B]. The heterocyclic copolymers thus obtained have excellent mechanical strength and, at the same time, improved heat resistance and solvent resistance. The present invention is illustrated below with reference to examples, but it should be construed that the invention is in no way limited to those examples.

EXAMPLE 1

Into a 3 liter flask equipped with a stirrer and a thermometer was charged a solution in 2300 ml of dimethylformamide (DMF) of 125 g of 4,4'-diphenylmethane diisocyanate (MDI), 132 g of tolidine diisocyanate (TODI), 1.3 g of phenyl isocyanate and 28.0 g of hydrogen cyanide.

Subsequently, a solution of 0.098 g of sodium cyanide in 20 ml of DMF was added as a catalyst to the flask, and the contents of the flask were allowed to undergo reaction at a temperature of 30°–40° C. for 30 minutes.

Then, a mixture of 52.6 g of 96% sulfuric acid, 60 g of water and 150, ml of DMF was added to the flask, and the contents of the flask were allowed to undergro reaction at a temperature of 80°–90° C. for 30 minutes.

After the completion of this reaction, the solution obtained was poured into water to precipitate a copolymer.

The copolymer thus obtained was identified as a polyparabanic acid copolymer comprising 50 mol% of the aforementioned recurring unit [A] in which the group R is

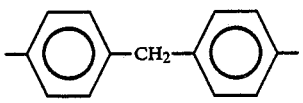

and 50 mol% of recurring unit [B], and having an intrinsic viscosity as measured in DMF at 30° C. of 1.1 dl/g. The intrinsic viscosity referred to herein is a value as measured by the above-mentioned procedure.

Powder of the polyparabanic acid copolymer thus obtained was dissolved in DMF to prepare a solution containing 20% by weight of the copolymer.

Subsequently, the thus obtained solution was deaerated under the vacuum condition, and the deaerated solution was then casted on a glass plate and heated at a temperature of 150° C. for 10 minutes and then at a temperature of 260° C. for 40 minutes to obtain a dried copolymer film of 25 μm in thickness. Properties of the polparabanic acid copolymer film were measured.

The results obtained are shown in Table 1.

COMPARATIVE EXAMPLE 1

Example 1 was repeated except that a solution in 2300 ml of DMF of 250 g of MDI, 1.5 g of phenyl isocyanate and 28.0 g of hydrogen cyanide was used. There was obtained PPA homopolymer having an intrinsic viscosity of 1.1 dl/g.

Subsequently, the thus obtained PPA homopolymer powder was used in the same manner as in Example 1 to obtain a PPA homopolymer film of 25 μm in thickness. Properties of the PPA homopolymer film thus obtained were measured.

The results obtained are shown in Talbe 1.

COMPARATIVE EXAMPLE 2

Example 1 was repeated except that a solution in 2300 ml of DMF of 264 g of TODI, 1.2 g of phenyl isocyanate and 28.0 g of hydrogen cyanide was used. There was obtained PPA homopolymer having an intrinisic viscosity of 1.04 dl/g.

Subsequently, the PPA homopolymer powder thus obtained was used in the same manner as in Example 1 to obtain a PPA homopolymer film of 25 μm in thickness. Properties of the thus obtained PPA homopolymer film were meansurd.

The results obtained are shown in Table 1.

TABLE 1

|  |  | Ex. 1 | Compar. Ex. 1 | Compar. Ex. 2 |
|---|---|---|---|---|
| Mechanical strength | Tensile strength | 1647 kg/cm$^2$ | 892 kg/cm$^2$ | 943 k/cm$^2$ |
|  | Flexing resistance | 2.4 × 10$^4$ times | 1.5 × 10$^4$ times | 0.5 × 10$^4$ times |
| Heat resistance | Heat-shrinking properties | 0.2% | 0.5% | 0.1% |
|  | Long term heat resistance | 180° C. | 160° C. | 190° C. |
| Solvent resistance | Alkali resistance | 1 μm | 44 μm | 1 μm |

The values of properties indicated in the table above are those as measured by the following procedures.

Tensile strength: The test specimen was measurd using a tensile tester at 23° C., RH 50% and a tensile rate of 50%/min.

Flexing resistance: ASTM D-2176-69

Heat-shrinking properties: The test specimen was heated at 280° C. for 1 hour, and the dimension of the test specimen, before and after the heat treatment, was measured at 23° C. and RH 50%.

Long-term heat resistance: UL 746B

Alkali resistance: The test specimen was immersed in 5% aqueous NaOH solution at 50° C. for 2 minutes, and then the reduced thickness of the thus treated specimen was measured.

Intrinsic viscosity: The measurement was conducted in DMF solution at 30° C.

EXAMPLE 2

Example 1 was repeated except that a solution in 2300 ml of DMF of 62.5 g of MDI, 198 g of TODI, 1.2 g of phenyl isocyanate and 28.0 g of hydrogen cyanide was used. There was obtained a polyparabanic acid copolymer comprising 25 mol% of the same recurring unit [A] as in Example 1 and 75 mol% of the recurring unit [B], and having an intrinsic viscosity of 0.9 dl/g.

Subsequently, powder of the polyparabanic acid copolymer thus obtained was used in the same manner as in Example 1 to obtain a film. Properties of the film thus obtained were meausred.

The results obtained are shown in Table 2.

COMPARATIVE EXAMPLE 3

Example 1 was repeated except that a solution in 2300 ml of DMF of 250 g of MDI, 2.3 g of phenyl isocyanate and 28.2 g of hydrogen cyanide was used. There was obtained PPA homopolymer having an intrinsic viscosity of 0.9 dl/g.

Subsequently, powder of the PPA homopolymer thus obtained was used in the same manner as in Example 1 to obtain a film. Properties of the film thus obtained were measured.

The results obtained are shown in Table 2.

TABLE 2

|  |  | Ex. 2 | Compar. Ex. 3 |
|---|---|---|---|
| Mechanical strength | Tensile strength | 1895 kg/cm$^2$ | 807 kg/cm$^2$ |
|  | Flexing resistance | 2.9 × 10$^4$ times | 1.3 × 10$^4$ times |
| Heat resistance | Heat-shrinking properties | 0.1% | 0.5% |
|  | Long term heat resistance | 190° C. | 160° C. |
| Solvent resistance | Alkali resistance | 1 μm | 5 μm |

EXAMPLE 3

Example 1 was repeated except that a solution in 2300 ml of DMF of 87 g of 2,4-tolylene diisocyanate (2,4-TDI), 132 g of TODI, 0.4 g of phenyl isocyanate and 27.8 g of hydrogen cyanide was used. There wasa obtained polyparabanic acid copolymer comprising 50 mol% of the recurring unit [A] in which the group R is

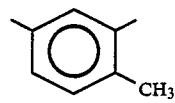

and qb 50 mol% of the recurring unit [B], and having an intrinsic viscosity of 0.8 dl/g.

Subsequently, powder of the thus obtained polyparabanic acid copolymer was used in the same manner as in Example 1 to obtain a film. Properties of the film thus obtained were measured.

The results obtained are shown in Table 3.

COMPARATIVE EXAMPLE 4

Example 1 was repeated that a solution in 2300 ml of DMF of 87 g of 2,4-TDI, 125 g of MDI, 0.2 g of phenyl isocyanate and 27.7 g of hydrogen cyanide was used. There was obtained PPA copolymer comprising 50 mol% of the recurring unit [A] in which the group R is

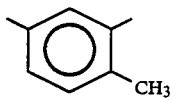

and 50 mol% of the recurring unit [A] in which the group R is

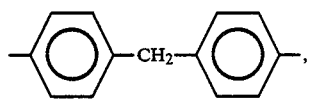

and having an intrinsic viscosity of 0.8 dl/g.

Subsequently, powder of the thus obtained PPA copolymer was used in the same manner as in Example 1 to obtain a film. Properties of the film thus obtained were measured.

The results obtained are shown in Table 3.

EXAMPLE 4

Example 1 was repeated except that a solution in 2300 ml of DMF of 126 g of 4,4'-diphenyl ether diisocyanate (EDI), 132 g of TODI, 1.4 g of phenyl isocyanate and 28.0 g of hydrogen cyanide was used. There was obtained a polyparabanic acid copolymer comprising 50 mol% of the recurring unit [A] in which the group R is

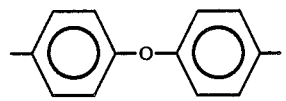

and 50 mol% of the recurring unit [B], and having an intrinisic viscosity of 0.98 dl/g.

Subsequently, powder of the thus obtained polyparabanic acid copolymer was used in the same manner as in Example 1 to obtain a film. Properties of this film were measured.

The results obtained are shown in Table 4.

COMPARATIVE EXAMPLE 5

Example 1 was repeated except that a solution in 2300 ml of DMF of 252 g of EDI, 1.5 g of phenyl isocyanate and 28.0 g of hydrogen cyanide was used. There was obtained PPA homopolymer comprising only the recurring unit [A] in which the group R is

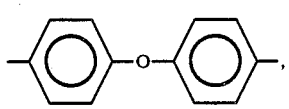

and having an intrinsic viscosity of 1.00 dl/g.

Subsequently, powder of the thus obtained PPA homopolymer was used in the same manner as in Example 1 to obtain a film. Properties of this film were measured.

The results obtained are shown in Table 4.

COMPARATIVE EXAMPLE 6

Example 1 was repeated except that a solution in 2300 ml of DMF of 264 g of TODI, 1.3 g of phenyl isocyanate and 28.0 g of hydrogen cyanide was used. There was obtained PPA homopolymer comprising only the recurring unit [B], and having an intrinsic viscosity of 0.97 dl/g.

Subsequently, powder of the thus obtained PPA homopolymer was used in the same manner as in Example 1 to obtain a film. Properties of this film were measured.

The results obtained are shown in Talbe 4.

TABLE 3

| | | Ex. 3 | Compar. Ex. 4 |
|---|---|---|---|
| Mechanical strength | Tensile strength | 1594 kg/cm$^2$ | 854 kg/cm$^2$ |
| | Flexing resistance | 2.0 × 10$^4$ times | 1.2 × 10$^4$ times |
| Heat resistance | Heat-shrinking properties | 0.2% | 0.5% |
| | Long-term heat resistance | 180° C. | 160° C. |
| Solvent resistance | Alkali resistance | 3 μm | 5 μm |

TABLE 4

| | | Ex. 4 | Compar. Ex. 5 | Compar. Ex. 6 |
|---|---|---|---|---|
| Mechanical strength | Tensile strength | 1720 kg/cm$^2$ | 947 kg/cm$^2$ | 921 kg/cm$^2$ |
| | Flexing resistance | 2.6 × 10$^4$ times | 1.7 × 10$^4$ times | 0.4 × 10$^4$ times |
| Heat resistance | Heat-shrinking properties | 0.2% | 0.5% | 0.1% |
| | Long term heat resistance | 180° C. | 160° C. | 190° C. |
| Solvent resistance | Alkali resistance | 1 μm | 4 μm | 1 μm |

EXAMPLE 5

Example 1 was repeated except that a solution in 2300 ml of DMF of 87 g of 2,6-tolylene diisocyanate (2,6-TDI), 132 g of TODI, 1.2 g of phenyl isocyanate and 28.0 g of hydrogen cyanide was used. There was obtained PPA copolymer comprising 50 mol% of the recurring unit [A] in which the group R is

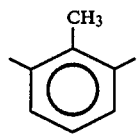

and 50 mol% of the recurring unit [B], and having an intrinsic viscosity of 0.6 dl/g.

Subsequently, powder of the thus obtained PPA copolymer was used in the same manner as in Example 1 to obtain a film. Properties of the film thus obtained were measured.

The results obtained are shown in Talbe 5.

COMPARATIVE EXAMPLE 7

Example 1 repeated except that a solution in 23 ml of DMF of 87 g of 2,6-TDI, 125 g of MDI, 1.3 g of phenyl isocyanate and 27.8 g of hydrogen cyanide was used. There was obtained PPA copolymer comprising 50 mol% of the recurring unit [A] in which the group R is

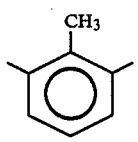

and 50 mol% of the recurring unit [A] in which the group R is

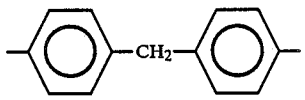

and having an intrinsic viscosity of 0.6 dl/g.

Subsequently, powder of the thus obtained PPA copolymer was used in the same manner as in Example 1 to obtain a film. Properties of this film were measured.

The results obtained are shown in Table 5.

TABLE 5

| | | Ex. 5 | Compar. Ex. 7 |
|---|---|---|---|
| Mechanical strength | Tensile strength | 1490 kg/cm² | 804 kg/cm² |
| | Flexing resistance | 1.8 × 10⁴ times | 1.0 × 10⁴ times |
| Heat resistance | Heat-shrinking properties | 0.2% | 0.5% |
| | Long-term heat resistance | 180° C. | 160° C. |
| Solvent resistance | Alkali resistance | 3 μm | 5 μm |

EXAMPLE 6

Example 1 was repeated except that a solution in 2300 ml of DMF of 80 g of p-phenylene diisocyanate (PPDI), 132 g of TODI, 0.6 g of phenyl isocyanate and 27.8 g of hydrogen cyanide was used. There was obtained PPA copolymer comprising 50 mol% of the recurring unit [A] in which the group R is

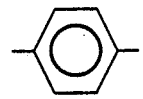

and 50 mol% of the recurring unit [B], and having an intrinsic viscosity of 1.0 dl/g.

Subsequently, powder of the thus obtained PPA copolymer was used in the same manner as in Example 1 to obtain a film. Properties of the film thus obtained were measured.

The results obtained are shown in Table 6.

COMPARATIVE EXAMPLE 8

Example 1 was repeated except that a solution in 2300 ml of DMF of 160 g of PPDI, 0.8 g of phenyl isocyanate and 27.9 g of hydrogen cyanide was used. There was obtained PPA homopolymer comprising only the recurring unit [A] in which the group R is

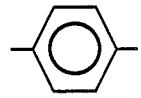

and having an intrinsic viscosity of 1.1 dl/g.

Subsequently, powder of the thus obtained PPA homopolymer was used in the same manner as in Example 1 to obtain a film. Properties of the film thus obtained were measured.

The results obtained are shown in Talbe qb 6.

COMPARATIVE EXAMPLE 9

Example 1 was repeated except that a solution in 2300 ml of DMF of 80 g of PPDI, 125 g of MDI, 0.7 g of phenyl isocyanate and 27.8 g of hydrogen cyanide was used. There was obtained PPA copolymer comprising 50 mol% of the recurring unit [A] in which the group R is

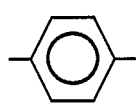

and 50 mol% of the recurring unit [A] in which the group R is

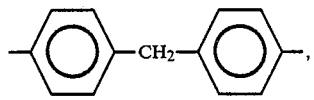

and having an intrinsic viscosity of 0.9 dl/g.

Subsequently, powder of the thus obtained PPA copolymer was used in the same manner as in Example 1 to obtain a film. Properties of the film thus obtained were measured.

The results obtained are shown in Talbe 6.

TABLE 6

| | | Ex. 6 | Compar. Ex. 8 | Compar. Ex. 9 |
|---|---|---|---|---|
| Mechanical strength | Tensile strength | 1720 kg/cm$^2$ | 1430 kg/cm$^2$ | 795 kg/cm$^2$ |
| | Flexing resistance | 1.8 × 10$^4$ times | 0.7 × 10$^4$ times | 1.4 × 10$^4$ times |
| Heat resistance | Heat-shrinking properties | 0.2% | 0.4% | 0.7% |
| | Long-term heat resistance | 180° C. | 160° C. | 160° C. |
| Solvent resistance | Alkali resistance | 2 μm | 4 μm | 4 μm |

EXAMPLE 7

Example 1 was repeated except that a solution in 2300 ml of DMF of 105 g of 1,5-naphthalene diisocyanate (NDI), 132 g of TODI, 1.0 g of phenyl isocyanate and 27.9 g of hydrogen cyanide was used. There was obtained PPA copolymer comprising 50 mol% of the recurring unit [A] in which the group R is

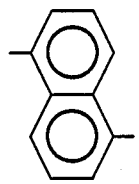

and 50 mol% of the recurring unit [B], and having an intrinsic viscosity of 0.8 dl/g.

Subsequently, powder of the thus obtained PPA copolymer was used in the same manner as in Example 1 to obtain a film. Properties of the film thus obtained were measured.

The results obtained are shown in Talbe 7.

COMPARATIVE EXAMPLE 10

Example 1 was repeated except that a solution in 2300 ml of DMF of 210 g of NDI, 1.2 g of phenyl isocyanate and 27.9 g of hydrogen cyanide was used. There was obtained PPA homopolymer comprising only the recurring unit [A] in which the group R is

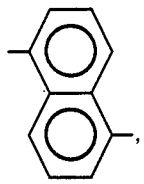

and having an intrinsic viscosity of 0.9 dl/g.

Subsequently, powder of the thus obtained PPA homopolymer was used in the same manner as in Example 1 to obtain a film. Properties of this film were measured.

The results obtained are shown in Table 7.

COMPARATIVE EXAMPLE 11

Example 1 was repeated except that a solution in 2300 ml of DMF of 105 g of NDI, 125 g of MDI, 1.1 g of phenyl isocyanate and 27.9 g of hydrogen cyanide was used. There was obtained PPA copolymer comprising 50 mol% of the recurring unit [A] in which the group R is

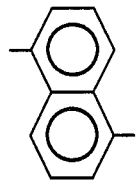

and 50 mol% of the recurring unit [A] in which the group R is

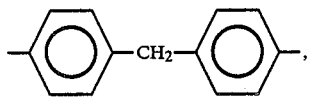

and having an intrinsic viscosity of 0.7 dl/g.

Subsequently, powder of the thus obtained PPA copolymer was used in the same manner as in Example 1 to obtain a film. Properties of this film were measured.

The results obtained are shown in Table 7

TABLE 7

| | | Ex. 7 | Compar. Ex. 10 | Compar. Ex. 11 |
|---|---|---|---|---|
| Mechanical strength | Tensile strength | 1794 kg/cm$^2$ | 1507 kg/cm$^2$ | 873 kg/cm$^2$ |
| | Flexing resistance | 1.8 × 10$^4$ times | 0.6 × 10$^4$ times | 1.1 × 10$^4$ times |
| Heat resistance | Heat-shrinking properties | 0.2% | 0.4% | 0.5% |
| | Long-term heat resistance | 180° C. | 160° C. | 160° C. |
| Solvent resistance | Alkali resistance | 2 μm | 4 μm | 4 μm |

What is claimed is:

1. A process for perparing a heterocyclic copolymer having recurring units represented by the following formulas [A] and [B], which process comprises hydrolyzing a reaction product of a diisocyanate compound represented by the formula [A]

OCN—R—NCO  [a]

(wherein R represents a divalent aromatic group selected from the class consisting of

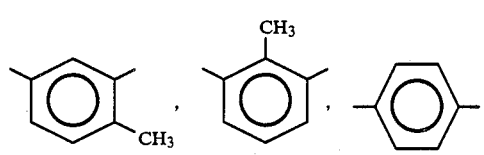

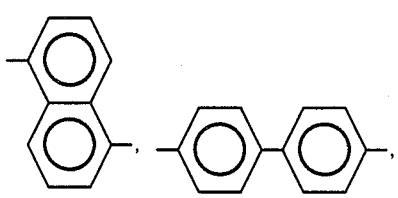

-continued

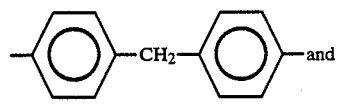and

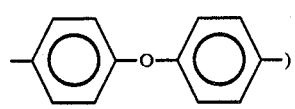

with tolidine diisocyanate and hydrogen cyanide;

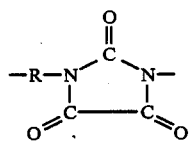 [A]

wherein R is as defined above.

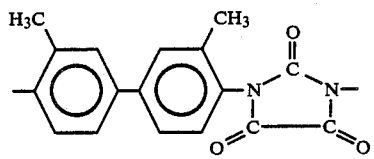 [B]

2. The process as claimed in claim 1 wherein the diisocyanate compound is 2,4-tolylene diisocyanate, 2,6-tolylene diisocyanate, paraphenylene diisocyanate, 4,4'-biphenyl diisocyanate, 1,5-naphthalene diisocyanate, 4,4'-diphenylmethane diisocyanate or 4,4'-diphenyl ether diisocyanate.

3. The process as claimed in claim 1 wherein the molar ratio of the diisocyanate compound to tolidine diisocyanate is 1:9–9:1, preferably 2:8–8:2.

4. The process as claimed in claim 1 wherein the reaction of the diisocyanate compound with tolidine diisocyanate and hydrogen cyanide is carried out in the presence of a polymerization regulator.

5. The process as claimed in claim 4 wherein the polymerization regulator is monoisocyanate or carboxylic acid anhydride.

6. The process as claimed in claim 4 wherein the polymerization regulator is used in an amount of 0.001–0.2 mole per 1 mole of the sum of the diisocyanate compound and tolidine diisocyanate.

7. The process as claimed in claim 1 wherein the hydrogen cyanide is used in an amount of 1–1.1 moles per mole of the sum of the diisocyanate compound and tolidine diisocyanate and, if necessary, a polymerization regulator present therein if any.

8. The process as claimed in claim 1 wherein the reaction of the diisocyanate compound with tolidine diisocyanate and hydrogen cyanide is carried out in the presence of a catalyst.

9. The process as claimed in claim 8 wherein the catalyst is sodium cyanide or potassium cyanide.

10. The process as claimed in claim 1 wherein the reaction of the diisocyanate compound with tolidine diisocyanate and hydrogen cyanide is carried out at a temperature of 0°–140° C.

11. The process as claimed in claim 1 wherein poly(iminoimidazolidine-dione) formed by the reaction of the diisocyanate compound with tolidine diisocyanate and hydrogen yanide is allowed to undergo hydrolysis reaction by bringing in contact with an aqueous solution of Brensted acid, or by bringing in contact with an anhydrous hydrogen chloride gas or hydrogen fluoride gas in the presence of water, followed by heating.

12. The process as claimed in claim 11 wherein the hydrolysis reaction is carried out at a temperature of 10°–150° C.

13. The process as claimed in claim 1 wherein the hetrocyclic copolymer has an intrinsic viscosity of 0.1–2.0 dl/g as measured in dimethylformamide at 30° C.

14. A film of sheet comprising a heterocyclic copolymer having recurring units represented by the following formulas [A] and [B]

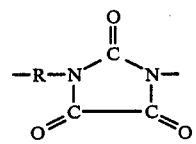 [A]

wherein R represents a divalent aromatic group selected from the class consisting of

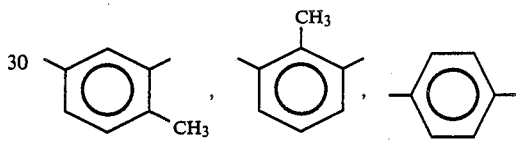

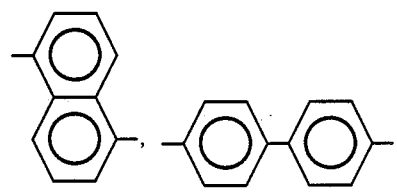

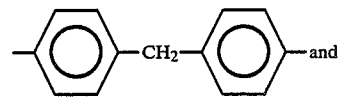and

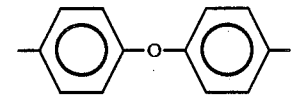

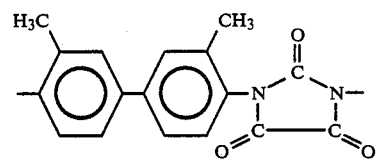 [B]

15. The film or sheet according to claim 14 wherein said copolymer has an intrinsic viscosity of 0.1–2.0 dl/g as measured in dimethylformamide at 30° C.

16. The film or sheet according to claim 14 wherein said copolymer is prepared by a process according to claim 1.

* * * * *